US012650994B2

(12) United States Patent
Feith et al.

(10) Patent No.: US 12,650,994 B2
(45) Date of Patent: Jun. 9, 2026

(54) CONTEXTUAL RE-RANKING BASED ON CURSOR POSITION FOR DOCUMENTATION RECOMMENDER SYSTEMS

(71) Applicant: Oracle International Corporation, Redwood Shores, CA (US)

(72) Inventors: Tomas Feith, Zurich (CH); Arno Schneuwly, Effretikon (CH); Saeid Allahdadian, Vancouver (CA); Matteo Casserini, Zurich (CH); Kristopher Leland Rice, Newark, CA (US); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/374,209

(22) Filed: Sep. 28, 2023

(65) Prior Publication Data
US 2025/0110961 A1    Apr. 3, 2025

(51) Int. Cl.
G06F 16/2457      (2019.01)
G06F 16/248       (2019.01)

(52) U.S. Cl.
CPC .. G06F 16/24578 (2019.01); G06F 16/24575 (2019.01); G06F 16/248 (2019.01)

(58) Field of Classification Search
CPC ...... G06F 8/73; G06F 11/323; G06F 11/3664; G06F 8/33; G06F 16/24578; G06F 16/24575; G06F 16/248
See application file for complete search history.

(56) References Cited

U.S. PATENT DOCUMENTS 6,049,325 A * 4/2000 Alexander ......... G01R 13/0218
                                                 345/157
12,130,809 B2 10/2024 Miller
(Continued)

OTHER PUBLICATIONS

Johnson, Jeff, et al., "Billion-scale similarity search with GPUs", https://arxiv.org/pdf/1702.08734.pdf, Feb. 28, 2017, 12pgs.
(Continued)

*Primary Examiner* — William P Bartlett
(74) *Attorney, Agent, or Firm* — Hickman Becker Bingham Ledesma LLP

(57) ABSTRACT

Here is dynamic and contextual ranking of reference documentation based on an interactively selected position in new source logic. A computer receives a vocabulary of lexical tokens, a sequence of references that contains a first reference to a first reference document before a second reference to a second reference document, respective subsets of the vocabulary that occur in the first and second reference documents, a new source logic that contains a sequence of lexical tokens, respective measurements of semantic distance between the new source logic and the first and second reference documents, and a selected position in the sequence of lexical tokens. Based on the selected position, the measurements of semantic distance are selectively increased. Based on that increasing the measurements of the semantic distance, a relative ordering of the first and second references is reversed to generate and display a reordered sequence of references.

18 Claims, 5 Drawing Sheets

(56)                    References Cited

U.S. PATENT DOCUMENTS

| | | | | |
|---|---|---|---|---|
| 2013/0074036 A1* | 3/2013 | Brandt | ..................... | G06F 8/33 |
| | | | | 717/113 |
| 2019/0073404 A1* | 3/2019 | Klouche | .......... | G06F 16/24578 |
| 2020/0097261 A1* | 3/2020 | Smith | ................... | G06F 40/174 |
| 2021/0132913 A1* | 5/2021 | Singh | ........................ | G06F 8/33 |
| 2023/0273776 A1* | 8/2023 | Wang | ........................ | G06F 8/36 |
| | | | | 717/106 |
| 2024/0127112 A1* | 4/2024 | Ziegler | ................. | G06N 20/00 |

OTHER PUBLICATIONS

Feng, Zhangyin, et al., "CodeBERT: A Pre-Trained Model for Programming and Natural Languages", Findings of the Assoctn for Computnl Linguistics: EMNLP 2020, pp. 1536-1547, https://doi.org/10.18653/v1/2020.findings-emnlp.139, Nov. 16, 2020, 12pgs.
Chen, Mark, et al., "Evaluating Large Language Models Trained on Code", https://arxiv.org/abs/2107.03374, Jul. 14, 2021, 35pgs.
"Stack Overflow—Where Developers Learn, Share, & Build Careers", Stack Exchange Inc., https://stackoverflow.com/, 2023, 13pgs.
"Stack Exchange Data Dump: Stack Exchange, Inc.", https://archive.org/details/stackexchange, 2023, 8pgs.
"ChatGPT: Optimizing Language Models for Dialogue", GOpenAI, LLC, https://chat.openai.com/, 2023, 1pg.
Rose, Stuart et al., "Automatic Keyword Extraction from Individual Documents", 03 2010, pp. 1-20.
Campos, Ricardo et al., "YAKE! Keyword Extraction from Single Documents using Multiple Local Features", Information Sciences, 509, 2020, 257-289.
Antlr, "Antlr v4", available: https://github.com/antlr/antlr4, 2021.

* cited by examiner

COMPUTER DISPLAY 200

NEW SOURCE LOGIC 110

BUTTON 230

| RECOMMENDATIONS 220 | Tensor key problem |
| | I don't think detach works like nograd |
| | Can pytorch optimize my RNN ? |
| | With Keras, two gigabytes isn't enough |

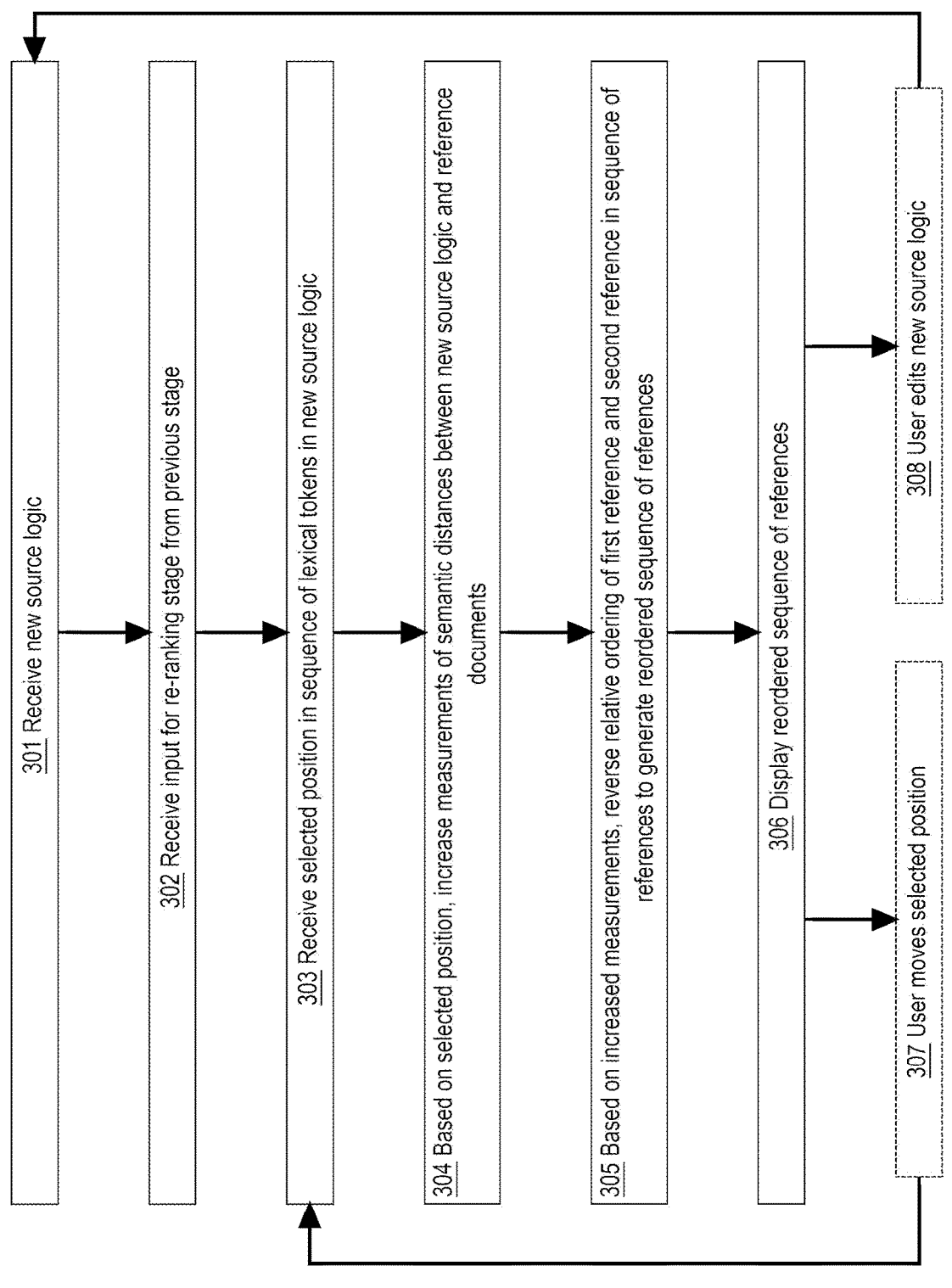

301 Receive new source logic

302 Receive input for re-ranking stage from previous stage

303 Receive selected position in sequence of lexical tokens in new source logic

304 Based on selected position, increase measurements of semantic distances between new source logic and reference documents 305 Based on increased measurements, reverse relative ordering of first reference and second reference in sequence of references to generate reordered sequence of references 306 Display reordered sequence of references 307 User moves selected position 308 User edits new source logic

SOFTWARE SYSTEM 500

502

502N

APPLICATION PROGRAM N

502C

APPLICATION PROGRAM 3

502B

APPLICATION PROGRAM 2

502A

APPLICATION PROGRAM 1

[...]

OPERATING SYSTEM
(e.g., WINDOWS, UNIX, LINUX, MAC OS, IOS, ANDROID, OR LIKE)

510

GRAPHICAL USER INTERFACE (GUI)

515

VIRTUAL MACHINE MONITOR (VMM)

530

BARE HARDWARE (e.g., COMPUTING DEVICE 400)

CONTEXTUAL RE-RANKING BASED ON CURSOR POSITION FOR DOCUMENTATION RECOMMENDER SYSTEMS

FIELD OF THE INVENTION

The present invention relates to natural language processing (NLP). Herein is dynamic and contextual ranking of reference documentation based on an interactively selected position in new source logic.

BACKGROUND

Software developers consume a considerable amount of documentation such as application programing interfaces (APIs), question-and-answer discussion websites, tutorials, and other knowledge bases to develop software applications. A common entry point to consume such developer support documentation is major search engines. However, finding high quality and up-to-date proprietary documentation by a web search can be challenging. Search results often are diluted with other content and often show outdated versions of proprietary documentation and guides. This problem also occurs with any public and versioned software stack and corresponding documentation.

State of the art natural language processing (NLP) provides generative functionality such as code completion for single lines and functions as well as natural language to code translations. The cognitive load on the user is high in the state of the art that requires direct user interaction for problem solving purposes. The approach herein is not generative and is more ergonomic because it expects less interaction than a generative approach.

Previous attempts at instrumenting document search for source code have two main shortcomings. First, code-to-code search engines neglect all information contained in non-code portions of documentation pages. Second, using an entire source file as a search query does not take into account the attention (i.e. visual and cognitive focus) of the software engineer user, such as the part of the source file currently being edited by the user. Assuming that the user is mostly interested in documentation related to the code being edited is an assumption overlooked by the state of the art. Thus, search results may have decreased relevance, and demand for computer time may be inflated by an additional chore of dynamically inspecting and disqualifying documents that are, based on the user's attention, not currently relevant.

BRIEF DESCRIPTION OF THE DRAWINGS

In the drawings:

FIG. 2 depicts a screenshot of an example computer display with recommendations based on dynamic relevance to new source logic;

FIG. 3 is a flow diagram that depicts an example computer process that dynamically and contextually (re-)ranks recommendations of reference documentation based on an interactively selected position in new source logic;

DETAILED DESCRIPTION

Figure 1:
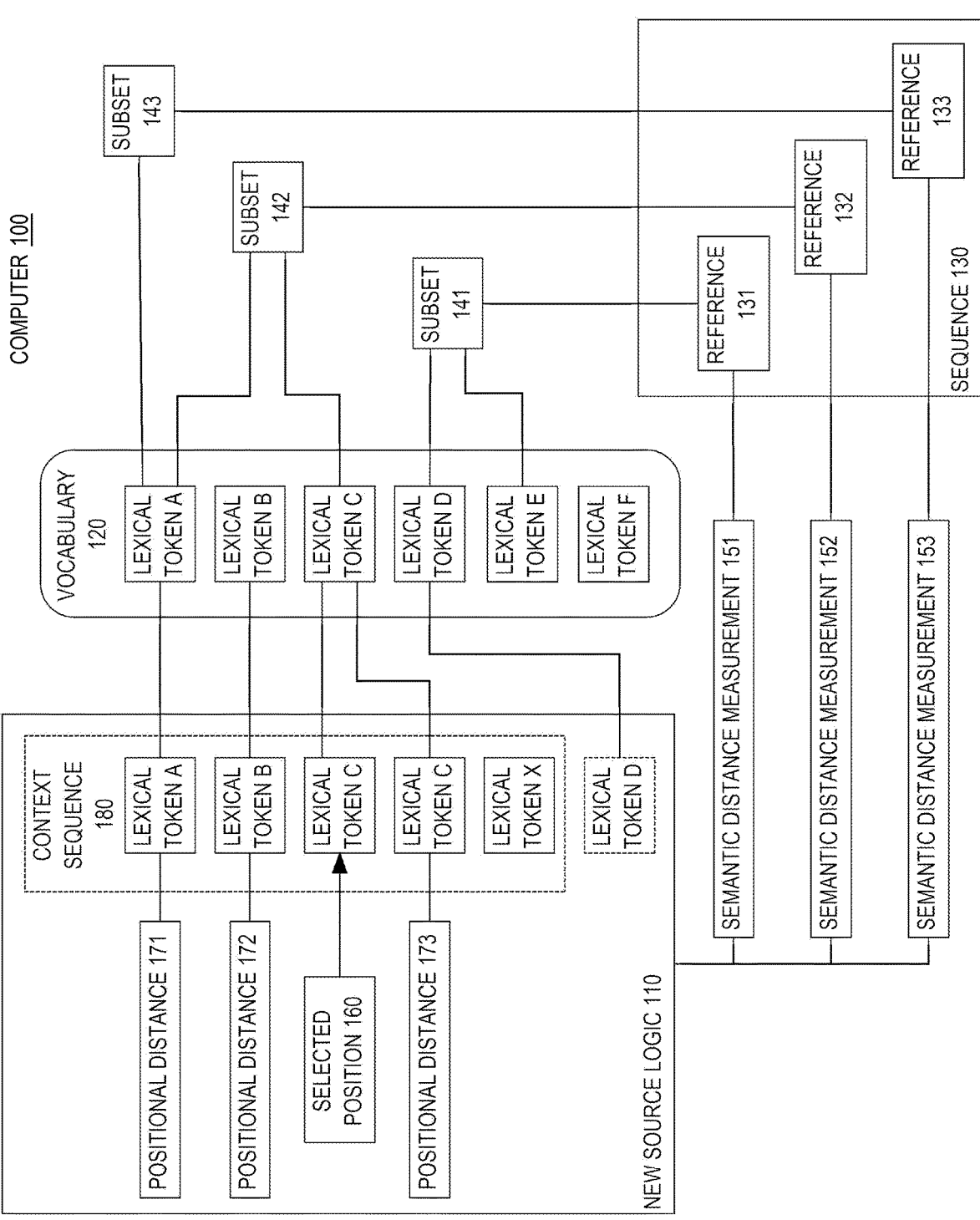
FIG. 1 is a block diagram that depicts an example computer that uses natural language processing (NLP) to dynamically and contextually rank recommendations of reference documentation based on an interactively selected position in new source logic.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Here is natural language processing (NLP) techniques for dynamic and contextual ranking of reference documentation based on an interactively selected position in new source logic. This is a novel documentation recommender framework that emphasizes documentation that is appropriate to a given code snippet. Because source logic is abundant in reference documentation, this documentation recommender includes, but is not limited to, code-to-code search, in which the goal is to find code snippets similar to a query snippet, and present documentation containing similar logic. However, this novel framework harnesses two extra sources of information to produce more relevant recommendations. First, this framework exploits non-code information in reference documentation to provide search results that are more relevant to changes that the user's current logic may still need. In other words, non-code information makes this recommender framework more goal oriented. Second, this framework exploits the interactive cursor position to provide recommendations that are more locally relevant to the code currently being edited by the user. This highly dynamic and highly contextual positional information provides search results that better match the actual focus of the user's attention. Thus, context and natural language are two sources of information that influence the recommendations.

By computing a contextual distance based on the cursor position and words present in the documentation, and adding this distance to the recommendations, this framework is able to re-rank (i.e. reorder) previous search results. As a re-ranker, this framework is fully general and can be applied as a post processor to search results from any legacy recommender system, which provides more contextually relevant recommendations for the user.

This framework has at least the following additional advantages. The recommendation framework is implemented as a pipeline that has at least three stages. Re-ranking is a last stage that is decoupled from previous stages so that, if only re-ranking is needed, then only the last stage recurs. Avoidance of repetition of earlier stages provides acceleration of the computer itself. Re-ranking based on dynamic context provides a more accurate (i.e. relevant) ranking. Here, increased accuracy of recommendation ranking is increased accuracy of the computer itself.

In an embodiment, a computer receives a vocabulary of lexical tokens, a sequence of references that contains a first reference to a first reference document before a second reference to a second reference document, respective subsets of the vocabulary that occur in the first and second reference documents, a new source logic that contains a sequence of lexical tokens, respective measurement of semantic distance between the new source logic and the first and second reference documents, and a dynamically and interactively selected position in the sequence of lexical tokens. Based on the selected position in the sequence of lexical tokens, the measurements of semantic distance are selectively increased. Based on that increasing the measurements of the semantic distance, a relative ordering of the first and second references is reversed to generate and display a reordered sequence of references.

1.0 Example Computer

FIG. 1 is a block diagram that depicts an example computer 100 that uses natural language processing (NLP) to dynamically and contextually rank recommendations of reference documentation based on interactively selected position 160 in new source logic 110. Computer 100 may be one or more of a rack server such as a blade, a personal computer, a mainframe, or a virtual computer.

Computer 100 contains new source logic 110 that is text that may, for example, contain one or more logic statements for a formal computer language such as a scripting language such as python or JavaScript, or for a general purpose programming language such as C++ or Java. New source logic 110 may instead contain database statement(s) such as any of: structured query language (SQL), data manipulation language (DML), data query language (DQL), or data control language (DCL). New source logic 110 is currently viewed or edited by a software engineer. For example, computer 100 may host a text editor or integrated development environment (IDE) that displays new source logic 110 for interactive editing.

For computer-assisted editing and reading, computer 100 may automatically suggest reference documentation that is highly relevant (i.e. semantically similar) to new source logic 110. In addition to displaying new source logic 110, computer 100 tokenizes new source logic 110 into an entire sequence of lexical tokens. For example, whitespace and punctuation characters may be detected in new source logic 110 and processed as separators for detecting boundaries between lexical tokens. Although the entire sequence of lexical tokens in new source logic 110 is not shown, the entire sequence contains the shown vertical sequence of non-distinct lexical tokens A, B, C, C, X, and D that are specially processed as discussed later herein. Lexical tokens A, B, C, C, X, and D are shown as a vertical sequence even though those lexical tokens might actually be displayed as a horizontal sequence, such as a line of text.

1.1 Predefined Corpus of Reference Documents

Computer 100 or a different computer may define a reference corpus that locates over a million internal or external (i.e. remote) reference documents (not shown). Each reference document contains human readable text such as any or a mix of source logic such as a code snippet or a script, formal documentation, and informal engineering discussions. Some of the reference documents are online within a filesystem or on the Internet and may, for example, be webpages. Reference documents may have different file formats or multipurpose internet media extension (MIME) types. For example, a document may be a text file, a hypertext markup language (HTML) webpage, a word processor file, or other common document format.

Each of references 131-133 is a reference to a distinct reference document in the reference corpus. Each of references 131-133 identifies a distinct reference document. For example, each of references 131-133 may contain a universal resource locator (URL) that locates a distinct reference document. The reranking approach herein is based on processing metadata and content statistics of reference documents in the reference corpus. However, this reranking approach does not require accessing the reference documents themselves. Ranking and reranking are discussed later herein.

1.2 Predefined Vocabulary of Lexical Tokens

For example, predefined vocabulary 120 is a set of distinct lexical tokens A-F that variously occur in various reference documents. Lexical tokens A-F are preselected for inclusion in vocabulary 120 to maximize accuracy of searching the reference corpus for reference documents that are semantically similar to new source logic 110. Corpus information theoretics such as corpus term frequency of a lexical token, document term frequency, and/or inverse document frequency may be used to preselect lexical tokens that maximize document selectivity. In an embodiment, learned inference by a machine learning model may be used to preselect vocabulary 120. In an embodiment, a formal grammar of a language contains predefined keywords that can become lexical tokens A-F, in which case they may define vocabulary 120 even before the reference corpus exists. The criteria for inclusion of a lexical token in vocabulary 120 is orthogonal to reranking herein. It is sufficient for computer 100 to receive a predefined vocabulary 120 so, for example, computer 100 does not need to access the reference documents themselves. Vocabulary 120 may be an unordered set of distinct lexical tokens.

New source logic 110 and vocabulary 120 both contain respective pluralities of lexical tokens, and those pluralities of lexical tokens partially overlap. For example, lexical tokens A-D are contained in both new source logic 110 and vocabulary 120. However, lexical tokens E-F occur in vocabulary 120 but not in the shown vertical sequence of lexical tokens in new source logic 110. For example, lexical token E might occur elsewhere in new source logic 110, but not in the vertical sequence of lexical tokens in new source logic 110. Lexical token F might not occur at all in new source logic 110, for example.

1.3 References to Reference Documents in Corpus

References 131-133 each refers to a distinct reference document that contains a respective sequence of non-distinct lexical tokens, and some of those are lexical tokens in vocabulary 120. Herein lexical tokens A-F are also referred to as vocabulary tokens. Which vocabulary tokens occur in which reference documents of references 131-133 are indicated by subsets 141-143 that may be metadata that computer 100 receives or generates. For example as shown by subset 141, reference 131 refers to a reference document that contains lexical tokens D-E but not lexical tokens A-C and F.

Lexical token B might occur nowhere in the reference corpus, but might be included in vocabulary 120 due to being a reserved keyword in a formal grammar as discussed above. References 131-133 match new source logic 110, which means that references 131-133 refer to reference documents that are semantically similar to new source logic 110. Which and how many references match new source logic 110 depends on matching that is implementation specific. An exemplary matching embodiment is as follows.

1.4 Documentation Recommender Pipeline

Although not shown, a documentation recommender pipeline may generate and provide to a software engineer user, through an IDE, sequence 130 that contains an ordered set of references 131-133 that refer to a ranked subset of the reference corpus. Sequence 130 contains only the most relevant few references that refer to reference documents that are the most semantically similar to new source logic 110. For example, the IDE may display sequence 130 as results of an automated search within the reference corpus for reference documents that contain corpus tokens in a distribution most similar to the distribution of corpus tokens in new source logic 110.

1.5 Corpus Preprocessing is First Pipeline Stage

How many stages and computers the documentation rec- ommender pipeline has depends on the embodiment. In a most consolidated embodiment, the documentation recom- mender pipeline has only one computer, which actually contains the reference corpus, and the documentation rec- ommender pipeline needs only three stages to generate sequence 130 for new source logic 110. In an embodiment, a first stage analyzes the reference documents in the refer- ence corpus to generate vocabulary 120 and a subset for each reference document, including subsets 141-143. The first stage entails preprocessing of the reference corpus, which can occur once to generate corpus metadata, including vocabulary 120 and all subsets, including subsets 141-143. The corpus metadata can be reused as is for an unlimited amount of new source logics and users, including many distinct versions of evolving new source logic 110 while a user edits it. In an embodiment, the first stage occurs on a preprocessing computer that is not computer 100, and a second and third stage operate repeatedly, by accessing the corpus metadata instead of the reference documents in the reference corpus, to generate many search result sequences, including sequence 130, for many new source logics and users.

1.6 Matching and Initial Ranking is Second Pipeline Stage

The second stage performs matching that is dynamic only to the extent that the current version of new source logic 110 is used. In an embodiment, matching entails selecting sub- sets 141-143 that are most similar to the set of all vocabulary tokens in new source logic 110. The second stage generates an initial version of sequence 130, which is an initial ordering of references 131-133. The second stage generates a semantic distance measurement for each of references 131-133. Herein, a semantic distance measurement is a numeric magnitude that indicates how dissimilar are a particular reference document and new source logic 110. Because sequence 130 refers to reference documents that are most similar to new source logic 110, sequence 130 contains references 131-133 that have the lowest respective semantic distance measurements 151-153.

1.7 Reranking is Third Pipeline Stage

The third stage performs reranking (i.e. reordering) of sequence 130, but without changing which references are members of sequence 130. For example, sequence 130 contains exactly references 131-133 before and after reor- dering by the third stage. The third stage increases some or all of semantic distance measurements 151-153 to cause reordering of sequence 130 because sequence 130 always is sorted by ascending semantic distance. Effectively, the sec- ond stage overestimates similarity (i.e. underestimates semantic distance), and the third stage increases the accu- racy of semantic distance measurements 151-153 by selec- tively increasing their magnitudes by techniques herein. Computer 100 performs at least the third stage and, by increasing the accuracy of semantic distance measurements 151-153, the third stage also increases the accuracy of computer 100 itself and increases the accuracy of sequence 130 by reordering.

1.8 Dynamic (e.g. Interactive) Selected Position

Selective increasing of semantic distance measurements 151-153 is highly dynamic and highly contextual based on the location within new source logic 110 that the user has interest in, which is selected position 160. Depending on the embodiment, selected position 160 may be a position of a text editor caret, a position of a graphical cursor of an interactive pointing device, a currently selected (e.g. high- lighted) lexical token or, in the case of a touch screen, a touched location. In any case, selected position 160 indicates exactly one selected lexical token within the vertical sequence of lexical tokens in new source logic 110.

As discussed earlier herein, the vertical sequence might not contain all of the lexical tokens in new source logic 110. As defined here and no matter where selected position 160 is dynamically interactively moved to, whichever lexical token is currently indicated by selected position 160 is referred to herein as the selected lexical token or the focus lexical token. As defined here, the selected lexical token always is the midpoint between two half sequences of equal length (i.e. count of lexical tokens) in context sequence 180 in new source logic 110.

For example as shown, context sequence 180 contains two occurrences (i.e. instances) of lexical token C. As shown, the upper occurrence of lexical token C is the selected lexical token. The uniform length of both halves of context sequence 180 is fixed and predefined. In the shown example, the length of each half is two lexical tokens. In that case, the two equally sized halves of context sequence 180 are a top subsequence that contains lexical tokens A-B and a bottom subsequence that contains lexical tokens C and X.

1.9 Context Sequence in Source Logic

Lexical token D in new source logic 110 is not currently part of either half because lexical token D is positionally too far away from the selected lexical token. Thus, even though new source logic 110 may contain a sequence of thousands of non-distinct lexical tokens, and even though lexical token D is shown somewhat near to the selected lexical token in new source logic 110, the third stage only processes a sequence of five lexical tokens A, B, C, C, and X but not D. The (e.g. five) currently included lexical tokens that are sufficiently positionally near the selected lexical token are shown as contained in context sequence 180.

If selected position 160 moves, then which five lexical tokens are processed changes because which five lexical tokens are in context sequence 180 changes, which is why context sequence 180 is shown with a dashed outline. For example if selected position 160 moves from the upper occurrence of lexical token C to the lower occurrence of lexical token C, then lexical token A becomes excluded from context sequence 180, and lexical token D becomes included in context sequence 180.

The input to the third stage is selected position 160, new source logic 110 (e.g. as an entire sequence of lexical tokens), the initially sorted sequence 130, and a portion of the corpus metadata, which includes vocabulary 120, refer- ences 131-133, and subsets 141-143. The third stage does not access references or subsets for other reference docu- ments that are in the reference corpus but not in sequence 130, even if those other references and subsets were inspected by the second stage. The third stage uses context sequence 180 to selectively increase some or all of semantic distance measurements 151-153, which increases the accu- racy of semantic distance measurements 151-153, which may cause reordering of sequence 130.

1.10 Positional Distance

Selective increase of some or all of semantic distance measurements 151-153 occurs as follows. For each of the (e.g. five) lexical tokens in context sequence 180, a posi- tional distance (i.e. count of contiguous lexical tokens) between a particular lexical token and the selected lexical token is measured. The positional distance of the selected lexical token always is zero, which does not need calculation because it is a constant. For example as shown, lexical tokens A-B have respective positional distances 171-172 that are integers. Positional distance 172 has a value of one, and positional distance 171 has a value of two.

Although lexical token X is in context sequence 180, lexical token X is not a vocabulary token because lexical token X is not in vocabulary 120. In that case, a positional distance of lexical token X is unnecessary and is not used to adjust semantic distance measurements 151-153. Because lexical token B is a vocabulary token in context sequence 180, positional distance 172 is used to adjust semantic distance measurements 151-153 even though lexical token B does not occur in any of subsets 141-143 for sequence 130.

1.11 Occurrence Weight

In an embodiment, positional distances, which originally are integers, are unit normalized inverted to generate occurrence weights (i.e. coefficients) as follows. Here, unit normalization provides a real number from zero to one. Here inverted means that a minimal distance maps to the maximal real number of one, and a maximal distance maps to the minimal real number of zero. Here, an occurrence weight of zero is synonymous with exclusion from context sequence 180, which means that the third stage excludes (i.e. ignores) that occurrence of the lexical token. For example depending on which currently is selected position 160, the upper occurrence of lexical token C could have a positive occurrence weight and the lower occurrence of lexical token C could have a zero occurrence weight.

1.12 Distance Thresholds

In an embodiment, generating occurrence weights from positional distances entails a lower distance threshold and an upper distance threshold that is larger than the lower distance threshold, and both distance thresholds are predefined positive integers because positional distances are positive integers. The upper distance threshold is, by design, the uniform predefined size of either half of context sequence 180 as discussed earlier herein. Any positional distance greater than the upper distance threshold is outside of context sequence 180, which generates an occurrence weight of zero.

In an embodiment, any positional distance that is less than or equal to the lower distance threshold is normalized to generate an occurrence weight of one, and any positional distance that is greater than the upper distance threshold is normalized to generate an occurrence weight of zero (i.e. excluded from context sequence 180). In an embodiment, any positional distance that is exclusively between both distance thresholds generates an occurrence weight according to the following example weight formula.

$$\frac{\tau_2 - \delta}{\tau_2 - \tau_1}$$

The result of the above example weight formula is an occurrence weight, ranging between zero and one, of an occurrence of a lexical token in context sequence 180. The following terms have the following meanings in the above example weight formula.

$\tau_1$ is the predefined lower distance threshold.

$\tau_2$ is the predefined upper distance threshold.

$\delta$ is a positional distance of a lexical token in context sequence 180.

For example, the lower distance threshold may be one, and the upper distance threshold may be two. In that case, lexical token B has an occurrence weight of one because positional distance 172 does not exceed the lower distance threshold, which means that the above example weight formula is not applied for lexical token B. Likewise, lexical token A has a positive occurrence weight as measured by the above example weight formula because positional distance 171 does not exceed the upper distance threshold.

1.13 Highest Weight of Duplicate Occurrences is Token Weight

As shown, context sequence 180 contains two occurrences of lexical token C. From multiple occurrences of a same lexical token, only the highest of their occurrence weights is selected as the token weight for the lexical token. However, the multiple occurrences of that lexical token are still used, but all occurrences of a same lexical token share the same token weight (i.e. the highest occurrence weight).

In an embodiment, the highest occurrence weight is guaranteed to be for the occurrence with the lowest positional distance. For that lexical token in that embodiment, only the occurrence weight for the lowest of those positional distances needs calculating. For example in that embodiment, an occurrence weight would not be generated from positional distance 173 because that occurrence weight could not exceed the occurrence weight of the upper occurrence of lexical token C. For example and although not shown, the upper occurrence of lexical token C may have its own occurrence weight (e.g. value of one), which is used as the token weight of lexical token C.

1.14 Contextual Distance is Dynamic

In an embodiment in the third stage, measuring a contextual distance between context sequence 180 and any one of references 131-133 entails: a) summation of all token weights of all occurrences of all vocabulary tokens in context sequence 180 and b) summation of token weights only of occurrences of vocabulary tokens that occur in both of context sequence 180 and the subset for the reference. For example a context distance between context sequence 180 and reference 132 may involve subset 142, which may entail calculating above (a) as the sum of the token weights of lexical tokens A-B plus twice the token weight of lexical token C that occurs twice in context sequence 180. In that case, above (b) may be calculated as the token weight of lexical token A plus twice the token weight of lexical token C, but without using the token weight of lexical token B that is not in subset 142. The context distance between context sequence 180 and reference 132 may be calculated as (b) divided by (a). In an embodiment, context distances may also be scaled according to a predefined scaling coefficient.

The third stage increases semantic distance measurement 152 by adding, to semantic distance measurement 152, the (e.g. scaled) context distance between context sequence 180 and reference 132. A respective context distance also is measured for each of references 131 and 133 respectively using subsets 141 and 143 in the same way. Those respective context distances are used to increase semantic distance measurements 151 and 153 in a same way. However, subset 141 and context sequence 180 have no vocabulary tokens in common, even though reference 131 is in sequence 130. In that case, above (b) is zero for reference 131, which means that the context distance for reference 131 is zero, which means that the third stage does not increase semantic distance measurement 151 in this example. Even though a semantic distance measurement of a reference may be unchanged, the position of that reference in sequence 130 might change due to increases in semantic distance measurements of other reference(s) in sequence 130.

In those ways, the third stage selectively increases semantic distance measurements 151-153, which may cause reordering of sequence 130 as discussed earlier herein, which increases the accuracy of sequence 130.

1.15 Display and Interactivity of Highly Relevant References

After the third stage, sequence 130 may be displayed as a list of references to recommended reference documents that are likely to be highly relevant because they contain source logic or prose that is semantically similar to new source logic 110. Any reference in sequence 130 may be interactively selected such as clicked on with a pointer device such as a mouse, which may cause the reference document of the selected reference to be retrieved and displayed.

In an embodiment, reference 131 contains an URL and a title of a reference document. Display of sequence 130 may entail display of the title and/or URL of the reference document. Clicking or otherwise interactively selecting reference 131 may cause the URL to be sent to a web browser, which causes the web browser to retrieve and display the reference document.

If the user is dissatisfied with the displayed document, the user may further interact with computer 100 in any of the following ways. In one scenario, the user interactively selects a different reference in the list to cause retrieval and display of a different reference document. In another scenario, the user interactively moves selected position 160 to elsewhere in new source logic 110 which may eventually (e.g. automatically or only if manually requested such as by clicking a button) cause the third stage to recur which again causes reordering of sequence 130 without changing which references are members of sequence 130.

1.16 Avoidance of the Second Stage is Acceleration

Even though selected position 160 may dynamically interactively move around, the exact membership of references 131-133 in sequence 130 remains static and the second stage does not recur even though the third stage recurs. Avoidance of repetition of the second stage is an acceleration. For example in an embodiment, the third stage does not entail network communication because data structures 110, 120, 130, 141-143, and 151-153 are retained in memory of computer 100 for repetition of the third stage. If the second stage entails network communication that is avoided by avoiding repetition of the second stage, then computer 100 is accelerated. In any case and regardless of network communication, avoidance of repetition of the second stage always saves processor time, which accelerates computer 100.

The second stage should only recur (e.g. automatically or if manually requested such as by clicking a button) if new source logic 110 is itself revised (i.e. edited). Recurrence of the second stage causes recurrence of the third stage. In an embodiment, new source logic 110 is immutable (i.e. read only), in which case new source logic 110 cannot be revised. In that case, only the third stage can recur.

2.0 Example Computer Display

FIG. 2 depicts a screenshot of an example computer display 200 that may be an optional part of computer 100. Computer display 200 is part of an integrated development environment (IDE) that contains a text editor that contains new source logic 110 being edited.

Interactively pressing button 230 causes: a) invocation of the second or third stage(s) of the documentation recommender pipeline as discussed later herein for FIG. 3, which causes at least reordering of sequence 130 and possibly also complete regeneration of sequence 130 as discussed later herein for FIG. 3, and b) generation and display of recommendations 220 that is a visual presentation of reordered sequence 130, assuming that sequence 130 contains four references, even though only three references are shown in FIG. 1. Button 230 is exemplary, and may be replaced or supplemented with other interactive or automatic triggers such as a menu item or a compilation error such as a syntax parse error or a semantic error despite valid syntax of new source logic 110. For example, above (a) and (b) may occur even if new source logic 110 cannot parse or cannot compile. An individual recommendation (i.e. reference) in recommendations 220 may be interactively selected as discussed earlier herein.

In an embodiment, selected position 160 may indicate a selected lexical token that is any of the following:
- a lexical token that represents a new identifier (i.e. not a predefined keyword),
- a lexical token that occurs in a source comment (i.e. not parsed and not designated as a token in the grammar that treats comments as opaque),
- a lexical token that does not occur in a definition (i.e., body) of a subroutine (e.g. instead in the subroutine's signature or annotation), and
- a lexical token that is syntactically valid but not semantically valid. (i.e., compiler error despite successful parse, e.g. misspelled identifier elsewhere in new source logic 110).

3.0 Example Reranking Process

FIG. 3 is a flow diagram that depicts an example process that computer 100 may perform to dynamically and contextually (re-)rank recommendations of reference documentation based on interactively selected position 160 in new source logic 110. The steps of the process of FIG. 3 provide an implementation of the third (i.e. reordering) stage of the documentation recommender pipeline discussed earlier herein. As discussed below, the third stage may encompass some or all of automatic steps 301-306 that computer 100 performs. Interactive steps 307-308 are shown with dashed outlines to indicate that the user may perform steps 307-308.

The process of FIG. 3 presumes that the corpus preprocessing (i.e. first) stage already occurred exactly once and will not recur, which means that vocabulary 120 already is available and all subsets, including subsets 141-143, of all reference documents in the reference corpus already are available.

Step 301 receives new source logic 110. Step 301 invokes the second (i.e. initial ordering) stage that generates for new source logic 110: initial sequence 130 and initial semantic distance measurements 151-153 as discussed earlier herein. The second stage may be performed by computer 100 or a different computer.

From the previous (i.e. second) stage, step 302 receives input for the third (i.e. re-ranking) stage. Step 302 receives initial sequence 130 from the second stage. In an embodiment, step 302 receives vocabulary 120 from the first stage and exactly subsets 141-143 and initial semantic distance measurements 151-153 from the second stage. Computer 100 may retain vocabulary 120 and subsets 141-143. Even if the process of FIG. 2 later adjusts semantic distance measurements 151-153, computer 100 may retain separate copies of the original (i.e. initial) semantic distance measurements 151-153 as received from the second stage. Thus at times, computer 100 may simultaneously have initial copies and adjusted copies of semantic distance measurements 151-153.

Step 303 receives selected position 160 that is a location in the sequence of non-distinct lexical tokens in new source logic 110, such as interactively provided as discussed earlier herein.

Based on selected position 160 and its context sequence 180 of nearby lexical tokens as discussed earlier herein, step 304 selectively increases some or all of semantic distance measurements 151-153 as discussed earlier herein.

Based on increased measurements, step 305 reverses the relative ordering of at least two references in sequence 130 to generate a reordered sequence of references as discussed earlier herein. For example, step 305 may move the second reference in recommendations 220, shown as "I don't think detach works like nograd", into the last position (i.e. at the bottom). Additionally or instead, step 305 may move the first (i.e. top) reference in recommendations 220, shown as "Tensor key problem", into the second position. Any possible combination of movements of references might occur during reordering by step 305, and the user appreciates that the most contextually relevant references always are moved into the top positions of recommendations 220. Actual redisplay of this reordering occurs as follows.

Step 306 displays reordered sequence 130 as discussed earlier herein. For example, step 306 may display reordered recommendations 220. As discussed earlier herein, any of displayed references 131-133 may be interactively selected (e.g. clicked) to cause retrieval and display of the corresponding reference document, and the user may, one by one, view multiple references without causing the second or third stage to recur.

By operation of steps 305-306, ergonomics (i.e. usability) of recommendations 220 is increased. For example as shown in FIG. 2, the physical distance from button 230 to the most relevant references is minimized because the most relevant references are physically on top. In other words after clicking button 230 to refresh recommendations 220, the distance that the user must move the mouse pointer to select one of the most relevant references is decreased because step 306 has already moved that reference into one of the top positions in recommendations 220.

The state of the art, which lacks contextual reranking, cannot move the most relevant references based on dynamically selected position 160. Thus, the mouse pointer movement distance from button 230 to a highly contextually relevant reference is decreased over the state of the art. This decrease in mouse pointer movement is empirically measurable, which means that the increase in the ergonomics of display 200 is empirically measurable. Thus, the efficiency of computer 100 is objectively increased for capturing the intent of the user (i.e. detecting which reference is desired).

The user may eventually perform either of interactive steps 307-308. In step 307, the user moves selected position 160, such as by moving a text editor caret. In step 308, the user edits new source logic. In an embodiment, neither of steps 307-308 cause the second or third stage(s) to recur. However after either of steps 307-308, the user may press button 230 or otherwise request that sequence 130 be refreshed. In that case, which of the second or third stage(s) recur depends on which of steps 307-308 previously occurred.

If step 308 had occurred (i.e. new source logic 110 was revised), then both second and third stages recur in sequence, as shown by the back edge from step 308 to step 301. If instead only step 307 had occurred (i.e. only selected position 160 changed) then, as an acceleration, only the third stage recurs, as shown by the back edge from step 307 to step 303. In those ways, the accuracy and relevance of sequence 130 is increased.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
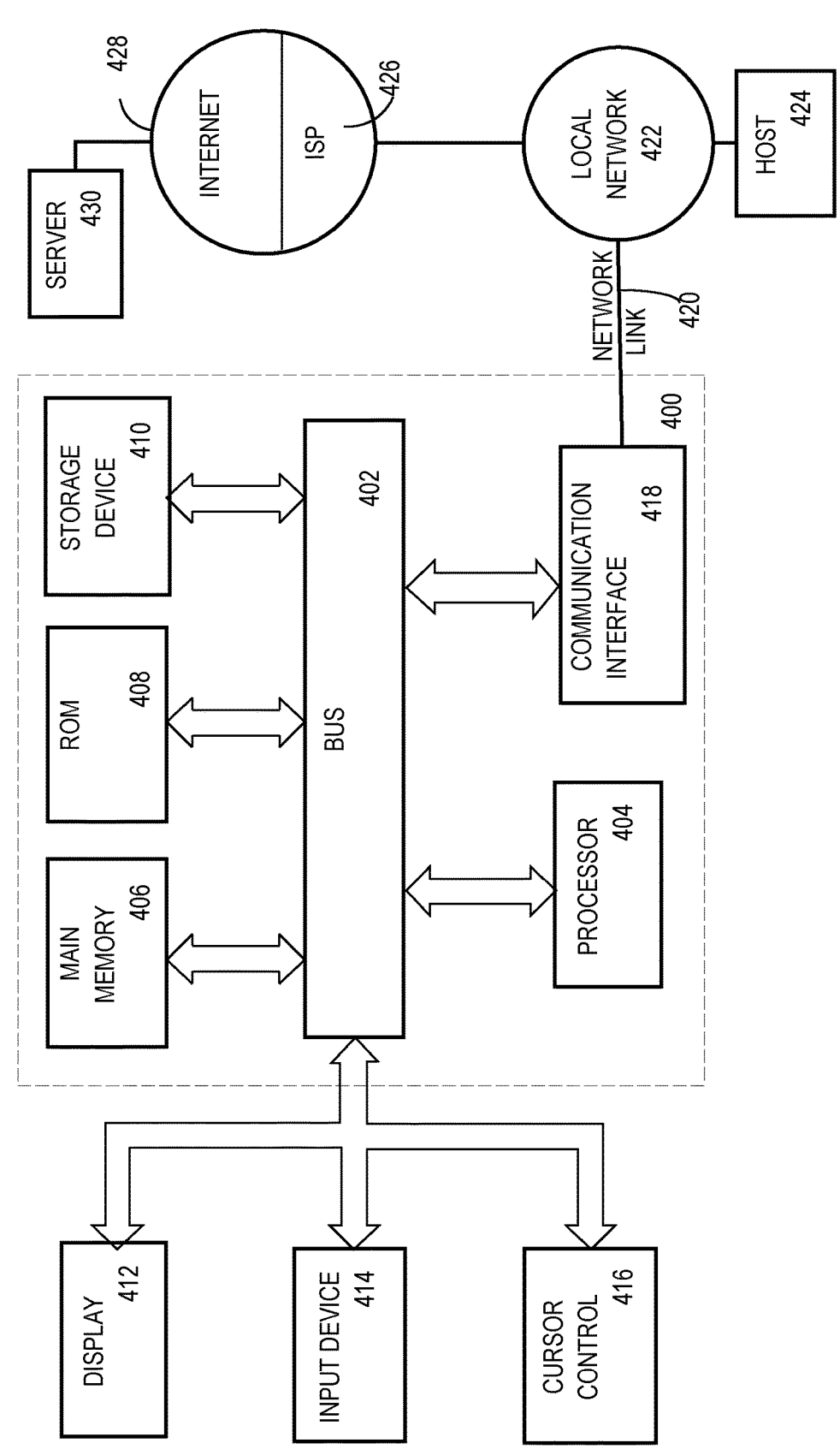
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Over View

Figure 5:
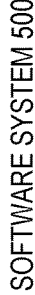
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

displaying, on a display screen of a computer, a new source logic that contains a sequence of lexical tokens;

receiving on a communication network and retaining in a memory in the computer:

a vocabulary plurality of lexical tokens, a sequence of references that contains a first reference to a first reference document before a second reference to a second reference document, a subset of the vocabulary plurality of lexical tokens that occurs in the first reference document, a subset of the vocabulary plurality of lexical tokens that occurs in the second reference document, a measurement of a semantic distance between the new source logic and the first reference document, and a measurement of a semantic distance between the new source logic and the second reference document, wherein the sequence of references is ascending sorted by semantic distance; and performing, after said receiving, without performing network communication:

a) displaying, on the display screen, the sequence of references;

b) increasing in the memory, based on an interactively selected position, on the display screen, in the sequence of lexical tokens:

said measurement of the semantic distance between the new source logic and the first reference document, and said measurement of the semantic distance between the new source logic and the second reference document;

c) ascending sorting, in the computer, the sequence of references by semantic distance, including reversing, based on said increasing the measurements of the semantic distances between the new source logic and the respective reference documents of the first reference and the second reference, a relative ordering of the first reference and the second reference in the sequence of references, to generate a reordered sequence of references; and d) displaying, on the display screen, said reordered sequence of references;

wherein the method is performed by the computer.

2. The method of claim 1 performed without accessing the first reference document or the second reference document.

3. The method of claim 1 wherein said increasing the measurement of the semantic distance between the new source logic and the first reference document is based on a subset of the vocabulary plurality of lexical tokens that occur in the sequence of lexical tokens.

4. The method of claim 3 further comprising measuring a plurality of positional distances that contains a respective positional distance between the interactively selected position in the sequence of lexical tokens and a respective position of each lexical token in the sequence of lexical tokens.

5. The method of claim 4 wherein said increasing the measurement of the semantic distance between the new source logic and the first reference document is based on the plurality of positional distances.

6. The method of claim 4 wherein:

the sequence of lexical tokens contains multiple instances of a particular lexical token;

the method further comprises detecting a minimum of the positional distances of the multiple instances of a particular lexical token.

7. The method of claim 1 wherein the interactively selected position in the sequence of lexical tokens indicates one selected from a group consisting of:

a lexical token that represents a new identifier, a lexical token that occurs in a source comment, a lexical token that does not occur in a definition of a subroutine, and a lexical token that is syntactically valid but not semantically valid.

8. The method of claim 1 wherein said increasing the measurement of the semantic distance between the new source logic and the first reference document is not based on a particular lexical token that does not occur in at least one selected from a group consisting of: a) the sequence of lexical tokens and b) the vocabulary plurality of lexical tokens.

9. The method of claim 1 wherein:

the interactively selected position in the sequence of lexical tokens is a boundary between a first half of the sequence of lexical tokens and a second half of the sequence of lexical tokens;

the first half of the sequence of lexical tokens and the second half of the sequence of lexical tokens have a same particular length that does not exceed a predefined maximum length;

the new source logic further contains multiple lexical tokens that do not occur in the sequence of lexical tokens.

10. One or more non-transitory computer-readable media storing instructions that, when executed by one or more processors, cause:

displaying, on a display screen of a computer, a new source logic that contains a sequence of lexical tokens;

receiving on a communication network and retaining in a memory in the computer:

a vocabulary plurality of lexical tokens, a sequence of references that contains a first reference to a first reference document before a second reference to a second reference document, a subset of the vocabulary plurality of lexical tokens that occurs in the first reference document, a subset of the vocabulary plurality of lexical tokens that occurs in the second reference document, a measurement of a semantic distance between the new source logic and the first reference document, and a measurement of a semantic distance between the new source logic and the second reference document, wherein the sequence of references is ascending sorted by semantic distance; and performing, after said receiving, without performing network communication:

a) displaying, on the display screen, the sequence of references;

b) increasing in the memory, based on an interactively selected position, on the display screen, in the sequence of lexical tokens:

said measurement of the semantic distance between the new source logic and the first reference document, and said measurement of the semantic distance between the new source logic and the second reference document;

c) ascending sorting, in the computer, the sequence of references by semantic distance, including reversing, based on said increasing the measurements of the semantic distances between the new source logic and the respective reference documents of the first reference and the second reference, a relative ordering of the first reference and the second reference in the sequence of references, to generate a reordered sequence of references; and d) displaying, on the display screen, said reordered sequence of references.

11. The one or more non-transitory computer-readable media of claim 10 performed without accessing the first reference document or the second reference document.

12. The one or more non-transitory computer-readable media of claim 10 wherein said increasing the measurement of the semantic distance between the new source logic and the first reference document is based on a subset of the vocabulary plurality of lexical tokens that occur in the sequence of lexical tokens.

13. The one or more non-transitory computer-readable media of claim 12 wherein the instructions further cause measuring a plurality of positional distances that contains a respective positional distance between the interactively selected position in the sequence of lexical tokens and a respective position of each lexical token in the sequence of lexical tokens.

14. The one or more non-transitory computer-readable media of claim 13 wherein said increasing the measurement of the semantic distance between the new source logic and the first reference document is based on the plurality of positional distances.

15. The one or more non-transitory computer-readable media of claim 13 wherein:

the sequence of lexical tokens contains multiple instances of a particular lexical token;

the instructions further cause detecting a minimum of the positional distances of the multiple instances of a particular lexical token.

16. The one or more non-transitory computer-readable media of claim 10 wherein the interactively selected position in the sequence of lexical tokens indicates one selected from a group consisting of:

a lexical token that represents a new identifier, a lexical token that occurs in a source comment, a lexical token that does not occur in a definition of a subroutine, and a lexical token that is syntactically valid but not semantically valid.

17. The one or more non-transitory computer-readable media of claim 10 wherein said increasing the measurement of the semantic distance between the new source logic and the first reference document is not based on a particular lexical token that does not occur in at least one selected from a group consisting of: a) the sequence of lexical tokens and b) the vocabulary plurality of lexical tokens.

18. The one or more non-transitory computer-readable media of claim 10 wherein:

the interactively selected position in the sequence of lexical tokens is a boundary between a first half of the sequence of lexical tokens and a second half of the sequence of lexical tokens;

the first half of the sequence of lexical tokens and the second half of the sequence of lexical tokens have a same particular length that does not exceed a predefined maximum length;

the new source logic further contains multiple lexical tokens that do not occur in the sequence of lexical tokens.

\* \* \* \* \*